United States Patent
Raymond

[11] 3,927,599
[45] Dec. 23, 1975

[54] UNIVERSAL ENGRAVING MACHINE

[76] Inventor: Jean-Louis Raymond, 5 rue de l'Hopital Saint-Louis, 75010 Paris, France

[22] Filed: Nov. 14, 1973

[21] Appl. No.: 415,562

[30] Foreign Application Priority Data
Nov. 24, 1972  France .................. 72.41892
Oct. 9, 1973  France .................. 73.36051

[52] U.S. Cl. ............ 90/13.2; 90/13 B; 33/23 F; 144/144; 33/25 C
[51] Int. Cl.² ............................ B23Q 35/121
[58] Field of Search ........... 90/13.1, 13.2, 13 B; 33/23 F, 25 R, 25 C, 23 R, 22; 144/144

[56] References Cited
UNITED STATES PATENTS
| | | | |
|---|---|---|---|
| 3,117,495 | 1/1964 | Swick | 90/13.1 |
| 3,249,016 | 5/1966 | Renegar | 90/13.1 |
| 3,289,538 | 12/1966 | Ostler | 90/13.1 |
| 3,417,661 | 12/1968 | Dancsik | 90/13.1 |

FOREIGN PATENTS OR APPLICATIONS
272,917  6/1927  United Kingdom .......... 90/13.2

*Primary Examiner*—Donald R. Schran
*Attorney, Agent, or Firm*—Burgess Ryan and Wayne

[57] ABSTRACT

An engraving machine utilizes several engraving tools each mounted in a mandrel slideably arranged in a sleeve within a tool carrier. The mandrels are located in close proximity to the associated tools in order to minimize vibration when driven at high rotational speeds by an endless belt, while the tool carrier is arranged to be displaced angularly about a horizontal axis as well as linearly along three mutually octangonal axes in response to the motions of a follower exploring a master pattern and transmitting its motions to the tool carrier through a pantograph.

8 Claims, 10 Drawing Figures

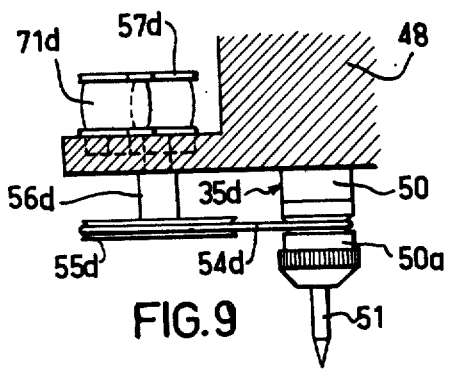
FIG.9
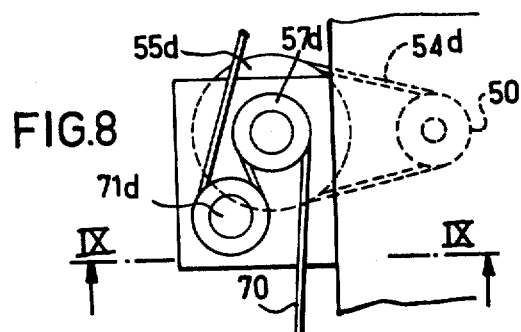
FIG.8
FIG.4
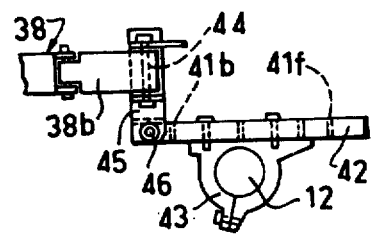
FIG.6
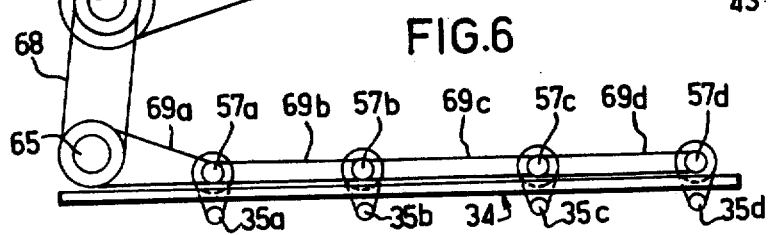
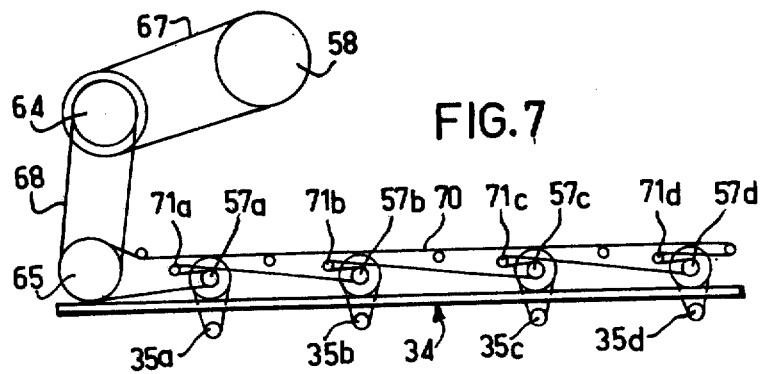
FIG.7

UNIVERSAL ENGRAVING MACHINE

The present invention relates to a universal engraving machine comprising a work table, at least two engraving tools, and exploring means for exploring a master pattern.

It is an object of the present invention to provide an engraving machine of the kind defined hereinabove, which is capable of producing simultaneously a plurality of engravings in series from a single master pattern.

It is another object of the present invention to provide an engraving machine capable of producing a plurality of engravings the dimensions of which are reduced according to a preselected ratio with respect to the dimensions of said master pattern.

It is yet another object of the invention to provide an engraving machine, the engraving tools of which are driven at a high speed; for instance 20,000 Rpm, without producing undesirable vibration.

These objects, and other objects which will become apparent from the description hereinafter, are achieved by the engraving engine in accordance with the present invention, wherein said engraving tools are mounted on tool carrying means displaceable in a longitudinal horizontal direction, a transverse horizontal direction, and in a substantially vertical direction in response to the displacements of said exploring means while the same are exploring said master pattern, said displacements being transmitted to said tool carrying means by mechanical means comprising a pantographic mechanism.

As the tool carrying means are displaceable in two horizontal directions, and as said tools are also displaceable in a vertical direction, the instant engraving machine is able to reproduce with a preselected reduction ratio master patterns defining engravings of uniform depth (two-dimensional engravings), or master patterns having a variable depth (three-dimensional engravings), while said master patterns may present any convenient shape, i.e., the shape of a cylinder etc..

The engraving machine according to the present invention also exhibits other advantageous features. It may be provided with a great number of various accessories, whereby said machine is capable of effecting not only all engraving operations, but also similar supplementary operations, under particularly advantageous conditions, particularly as far as the easy operation of the machine and its high output are concerned, the latter being due to the fact that a plurality of copies of the master pattern may be produced in one operation, the number of these copies, or workpieces, being equal to the number of engraving tools provided on the machine.

In one particularly advantageous embodiment the machine according to the present invention is capable of producing engravings in symmetry, as will be explained hereinafter.

The invention will be described hereinbelow with reference to the appended drawings which show several embodiments of the instant invention by way of example.

FIG. 4 shows the portion of the machine located at the right side of the section line III—III of FIG. 2, said portion being viewed in the direction of arrow IV.

FIG. 6 is a diagrammatic view showing the driving mechanism for the engraving tools of the machine shown in FIGS. 1 and 5.

FIG. 7 shows a modification of the driving mechanism.

FIG. 8 shows a detail of the driving machanism of FIG. 7.

FIG. 9 is a sectional view taken along the line IX—IX of FIG. 8.

Figure 1:
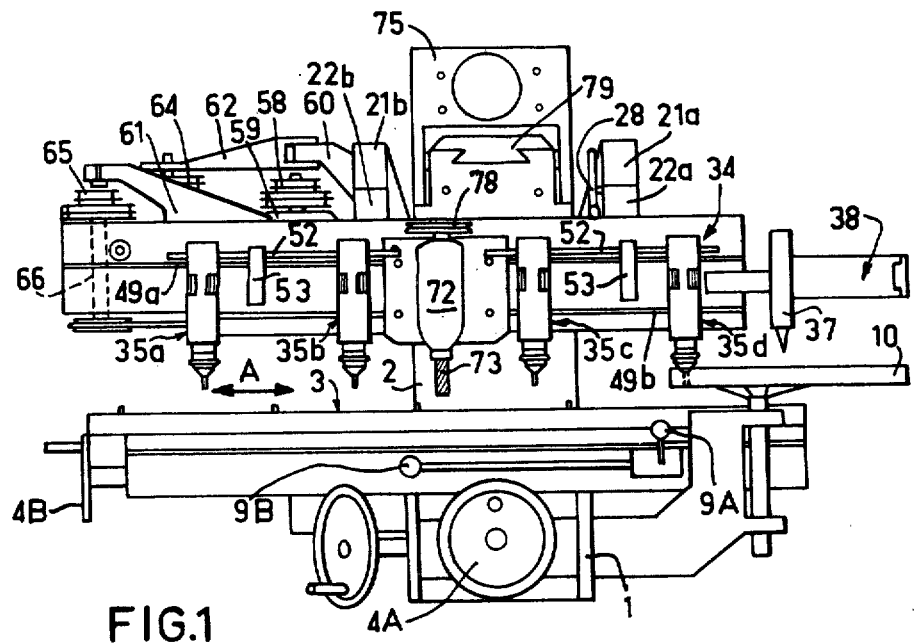
FIG. 1 is an elevational front view of the instant engraving machine according to a first embodiment.
Figure 3:
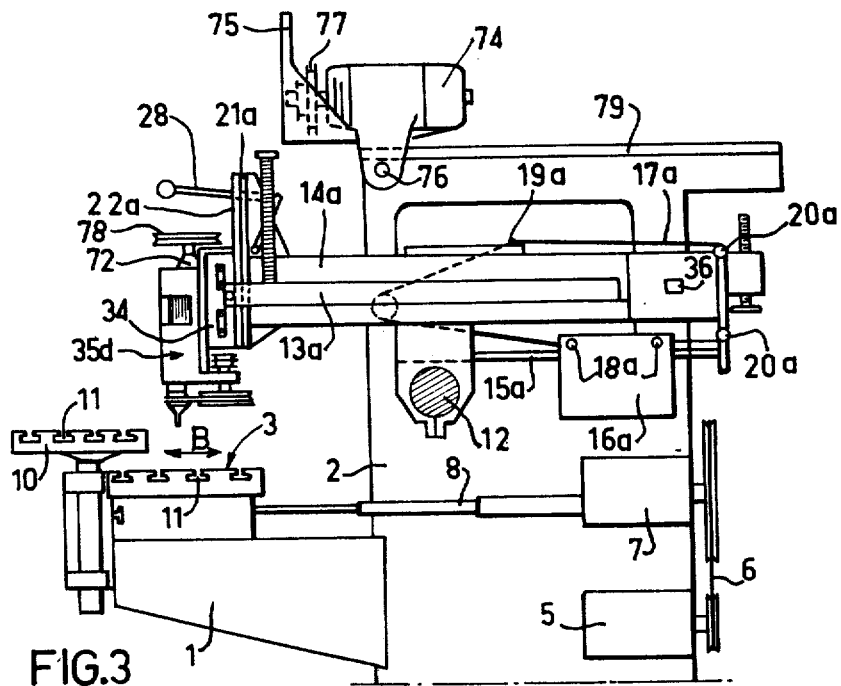
FIG. 3 is a partial sectional view taken along the line III—III of FIG. 2.
Figure 2:
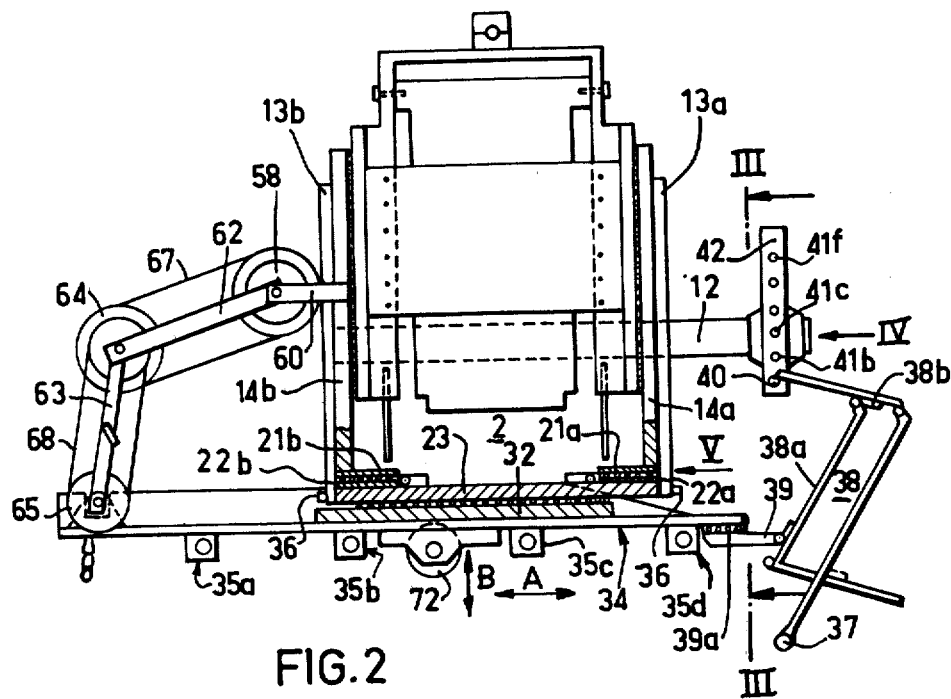
FIG. 2 shows the machine in FIG. 1, in plane partially sectional view.

In the embodiments shown in FIGS. 1 to 6 the engraving machine according to the invention comprises a support (FIGS. 1 and 3) integral with the frame 2 of the machine and supporting a work table 3 which is movable in two horizontal directions, one of which is perpendicular to the other, said directions being indicated respectively by the double arrows A and B in FIGS. 1 and 3; work table 3 is not shown on FIG. 2 with a view to simplifying the same. It is not necessary to describe this movable work table 3 in detail, as such tables are used in many well-known machine-tools; at any rate, the present invention is not limited to the particular construction of this work table. Is is thus sufficient to note that said work table can be displaced in two directions A and B, either manually or by means of two hand wheels 4a and 4b, or automatically by means of a motor 5 (FIG. 3) and of transmission means comprising a belt 6, a gear box 7 and a telescopic cardan shaft 8. Control members 9a and 9b allow, respectively, to start the automatic displacement of work table 3 and to stop the displacement of said table in a chosen position. Preferably, work table 3 has a rectangular configuration, its length in direction A being e.g., 120 cm and its width in the direction B e.g., 25 cm. This table may also be displaceable in a vertical direction by any convenient known means (not shown on the drawing). An auxiliary table 10, preferably of rectangular configuration, measuring e.g., 40 × 24 cm, is mounted on support 1 and vertically displaceable. Tables 3 and 10 comprise T-slots 11 (FIG. 3) in a manner known per se, which facilitate the mounting of pieces on these tables, by means of locking elements also known per se.

A fixed axis 12 is mounted on frame 2 horizontally and parallel to direction A slightly above, and rearwardly of, work table 3. Two first slide members 13a and 13b are mounted transversally on axis 12 so as to be able to pivot about said axis, said slide members being mounted on said axis for instance by means of roller bearings (not shown). These first slide members 13a and 13b are constituted e.g., by the lateral members of a first frame which is consequently pivotally mounted on axis 12. When said first frame is in a horizontal position, slide members 13a, 13b extend in direction B. On said first slide members 13a, 13b are slidingly mounted the two lateral members 14a, 14b of a second frame. At the lower part of the first frame, the side members of which constitute said first slide members 13a, 13b is mounted a rod 15a (FIG. 3) located above said slide members and extending parallel to the same. A counterweight 16a is slideably mounted on rod 15a. A cable 17a forming a loop is attached on the one hand to counterweight 16a, for instance at two locations 18a, and on the other hand to an element 19a of the side member 14a of the second frame. Cable 17a furthermore passes on two guide members 20a integral with said first frame. Consequently each movement of the second frame with respect to the first slide members 13a, 13b causes the counterweights 16a to be displaced correspondingly, but in an opposite direction, so that the entire assembly described may be dimensioned in such a way that-the total charge of the second frame (described hereinbelow) being taken into account- the gravitational center of the assembly is always located vertically above axis 12, whereby the said assembly always remains substantially in equilibrium on said axis.

Figure 5:
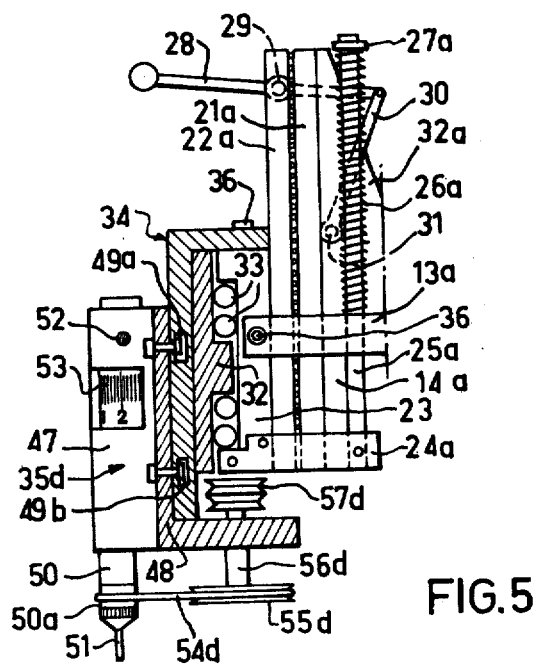
FIG. 5 is a portion of the machine viewed in the direction of arrow V of FIG. 2, certain parts being torn off.

As shown in FIGS. 1, 2, 3 and 5, on the front ends 14a, 14b of the second frame, which cooperate, respectively, with the first slide members 13a, 13b, are mounted two substantially vertical plates 21a, 21b which constitute vertical second slide members having movable plates 22a, 22b (FIGS. 2, 3 and 5). The lower parts of vertical movable plates 22a and 22b are interconnected by a cross-member 23 (FIGS. 2 and 5) on the ends of which are mounted pieces 24a (FIG. 5) extending rearward and supporting each the lower end of a vertical rod 25a; rod 25a extends freely through a vertical hole provided in the corresponding side member 14a of the second frame. A helical spring 26a is placed on each one of said rods 25a, said springs being normally compressed between the edge of said vertical hole provided in said member 14a, and a stop member 27a mounted on the top end of rod 25a. A control lever 28 is pivotally mounted at 29 on the inner side of vertical plate 22a or at an equivalent location, the rear end of said lever 28 being pivotally connected to a control rod 30, the other end of which is pivotally connected at a fixed location 31 to a stiffening member 32a of vertical plate 21a, or to a similar element. It will be understood that when the front end of control lever 28 is moved downwards the latter pivots about 29 and will tend to push vertical plate 20a and cross member 23 in a downward direction, helical spring 26 being then compressed. When the user stops exerting a downward directed pressure on said front end of lever 28, said cross member 23 will be automatically displaced in the opposite direction, i.e. in an upward direction. At its front face, cross member 23 forms a third slide member having a horizontal slideway for guiding a T-shaped plate 32; the sliding motion of plate 32 in said horizontal slideway is facilitated by balls 33 (FIG. 5). A vertical tool-carrying plate 34 is mounted by convenient means on the front face of plate 32, said tool-carrying plate extending horizontally in direction A and carrying, in the embodiment shown, four engraving tools 35a, 35b, 35c, 35d which will be described in detail hereinbelow. Due to the third slide member, i.e., due to the slideway provided in the front of cross member 23, tool carrying plate 34 is displaceable in the horizontal direction A. Due to the above-mentioned second slide members 21a, 21b the assembly constituted by tool-carrying member 34, plate 32 and vertical plates 22a, 22b is displaceable in a substantially vertical direction, as has been explained hereinabove. Furthermore due to the above-mentioned first slide members 13a, 13b the before-mentioned assembly comprising the tool-carrying plate 34 and completed by the vertical plates 22a, 22b and the second frame is displaceable in the horizontal direction B, while said assembly, completed by said first slide members 13a, 13b is angularly displaceable about axis 12 which is parallel to direction A. It is obvious that, as a result of this construction, the points of the different engraving tools 35a to 35d may be displaced in any desired manner in the horizontal plane, and furthermore the distance of said points from the surface of work table 3 may be modified by a displacement of control lever 28, or by angularly displacing the above described assembly about axis 12 in the vicinity of that position of said assembly wherein said first slide members 13a, 13 b are in a substantially horizontal equilibrium position, as shown in FIG. 3 FIG. 1 shows the tool-carrying plate 34 in a lowered position (control lever 28 being pushed downward), while FIGS. 3 and 5 show said tool-carrying plate in its raised position.

First slide members 13a, 13b allow, for instance, the second frame to be displaced slidingly in direction B, the maximum amplitude of said sliding motion being about 25 cm. Second sliding members 21a, 21b allow cross member 23 to be vertically displaced, the amplitude of said vertical displacement being, for instance, about 7 cm. The third slideway provided in cross member 23 allows for horizontal motion of tool-carrying plate 34 in direction A, the maximum amplitude of said horizontal displacement being, for example, 45 cm. The three sliding systems may be locked, for instance b means of screw 36, with a view to preventing the corresponding displacements.

The machine shown in FIGS. 1 to 6 also comprises a follower 37 for manually exploring the surface of a master pattern to be reproduced, said master pattern being mounted, for example, on auxiliary table 10. The displacements imparted manually to said follower 37 are transmitted with a preselected reduction ratio to tool carrying plate 34 by a pantograph known per se, generally designated by reference numeral 38 on FIGS. 1 and 2.

Arm 38a of pantograph 38 is pivotally mounted, as indicated in FIG. 2, on arm 39 which is mounted on the right hand end of tool carrying plate 34 through a vertical slide member 39a which is generally locked, except for one particular application of the machine which will be explained in detail hereinbelow. Arm 38b of pantograph 38 is pivotally mounted at a fixed location indicated at 40 which is integral with the stationary frame 2 of the machine. In the embodiment shown, especially in FIGS. 2 and 4, the reduction ratio of pantograph 38 can be varied by placing the fixed point 40 at selected locations respectively defined by a plurality of holes 41a, 41b, 41c, 41d, 41e, 41f, aligned in direction B, and provided in a bar 42 which, in the embodiment shown, is fixed by means of collar 43 on the end of the right hand portion of axis 12 protruding from the machine frame. FIG. 4 shows in detail the mechanism which has been called hereinbefore "fixed point 40" of pantograph 38. As shown in the Figure, the end of arm 38b is supported by means of a vertical pivot 44 on a substantially vertical column 45 the lower end of which is pivotally mounted on an axis 46 supported by a fork which may be screwedly fixed in one of the above-mentioned holes 41a to 41f of rod 42.

Pantograph 38 also comprises known means which allow the respective effective lengths of the various arms of said pantograph to be adjusted with a view to obtaining various reduction ratios which are preferable comprised between 2:1 and 8:1. Furthermore, the mechanism shown in FIG. 4 is so dimensioned that when fixed point 40 of pantograph 38 is brought into a position corresponding to the chosen reduction ratio and wherein it is located on the same level as holes 41a to 41f, the same chosen reduction ratio is applied to the horizontal displacements of follower 37 and to its vertical displacements, said vertical displacements being rendered possible by the pivotal mounting of the above-described assembly on axis 12, which assembly comprises tool-carrying plate 34; it will be noted that said pivotal motion is produced by that of pantograph 38 which is rendered possible by the horizontal pivoting axis 46 of column 45 (FIG. 4).

When follower 37 explores the surface of the master pattern to be reproduced, its vertical displacements corresponding to the various depths of the engravings will produce corresponding pivoting motions of tool-carrying plate 34 about horizontal axis 12, and may also produce vertical displacements of said tool carrying plate 34 with respect to the above-mentioned second slide members 21a, 21b, which causes springs 26a (FIG. 5) to be compressed. The horizontal and vertical displacements of follower 37 are transmitted, as described hereinabove, especially through tool-carrying plate 34, to the points of the engraving tools 35a to 35d, said displacements being transmitted with the chosen reduction ratio, whereby said tools reproduce the master pattern with dimensions reduced in accordance with said ratio. In the embodiment shown, four engraved work-pieces may be produced, either from a single plate of comparatively great length, which is fixedly mounted on work-table 3, said work pieces being produced in four different respective zones of said plate, while the distance between said zones corresponds to the distance between the different engraving tools; said engraved work-pieces may also be produced from four different plates fixedly mounted on said work table 3 in respective positions corresponding to the positions of the engraving tools. The pivotal motions of tool-carrying plate 34 about axis 12 enable the operator to obtain an inclination of the engraving tools with respect to the vertical position, which is advantageous for instance when it is desired to produce engravings radially on a cylinder fixedly mounted on table 3 with its axis parallel to horizontal direction A. Depending on the nature of the work to be carried out, the pivotal motions of the assembly comprising tool-carrying plate 34 about horizontal axis 12 may be prevented by convenient locking means. Furthermore, the sliding motions of said tool-carrying plate with respect to the above-mentioned vertical second slide members 21a, 21b may also be prevented by means of convenient screws 36. When both these pivotal and vertical motions are prevented by such locking means and screws it is possible to produce four engraved work pieces from a master pattern the engraving of which has a uniform depth; in this case, follower 37 and the respective points of engraving tools 35a to 35d are only displaced in the two horizontal directions A and B.

In the embodiment shown in FIGS. 1 to 6, the engraving tools 35a to 35d are constituted each by a milling cutter spindle which is rotatively driven about a vertical axis at a high speed, for instance about 20 000 r.p.m.. As shown especially in FIG. 5 which represents milling cutter spindle 35d, each one of said spindles comprises a tubular body 47 which is integral with the front face of the vertical flange of an L-shaped piece or section 48; L-shaped section 48 is slidingly mounted on the front face of tool-carrying plate 34 so as to be displaceable in horizontal direction A. In the embodiment shown in FIG. 5 said front face of tool-carrying plate 34 comprises two T-shaped grooves 49a, 49b wherein two correspondingly shaped lugs are slidingly mounted, said lugs being integral with said L-shaped section 48 and being adapted to allow in a manner known per se L-shaped section 48 to be locked in a convenient horizontal position on tool-carrying plate 34, for instance, by tightening screws which are provided to this end. It will be seen that this arrangement allows for adjusting the horizontal positions of engraving tools 35a to 35d, and, especially the respective distances between said tools, in accordance with the engraving operations to be carried out, and, more particularly, in accordance with the respective distances between the four zones to be engraved on a single plate fixedly mounted on work table 3.

Each one of spindles such as 35d (FIG. 5) comprises a mandrel 50 which is slideably mounted in tubular body 47 so as to be vertically displaceable and capable of being locked in a pre-selected position. The displacements of said mandrel are of two different types: First, a vertical displacement of predetermined amplitude which is on the order of some millimeters and sufficient to bring the lower point of small diameter milling cutter 51 into a position adjacent the surface of work table 3, said milling cutter being mounted in a rotating head 50a which is mounted, in turn, on the lower portion of mandrel 50. This vertical displacement of a pre-selected amplitude is preferably controlled for each couple of adjacent spindles, for instance for spindles 35a and 35b, by means of a pivotally mounted control rod 52 (FIG. 1) which can be manually operated, e.g., by means of a lever 53. Furthermore, the vertical position of the point of milling cutter 51 of each engraving tool may be adjusted with a very high precision by means of a known mechanism comprising a micrometer dial screw which acts on the slidingly mounted mandrel 50 and which may be operated by means of a rotatively mounted ring 53 (FIG. 5), said ring being accessible through a window provided in the wall of tubular body 47. The maximum amplitude of the micrometric adjustment is also on the order of some millimeters. It will be understood that this micrometric adjustment is also effective when by acting on levers 53, the engraving tools are disengaged from the respective work pieces by raising said tools, e.g., with a view to bringing the tools in another position wherein they are located above other zones to be engraved.

As shown in FIG. 5 the rotating head 50a of each mandrel, such as 35d carries a grooved pulley for driving said head by means of a belt 54b cooperating with a pulley 55b which is mounted on the lower end of an axis 56d. Axis 56d rotates freely in a bearing (not shown) integral with the horizontal flange of section piece 48, and the top end of said axis carries a two-staged pulley 57d. It will be understood that the assembly constituted by elements 54d to 57d is displaceable horizontally with respect to tool-carrying plate 34, together with the corresponding spindle 35d and the section piece 48 supporting the same.

FIG. 6 is a diagrammatic plane view showing only tool-carrying plate 34, the four spindles 35a to 35d and the four two-staged pulleys 57a to 57d. Said four pulleys are simultaneously driven from a multi-staged pulley 58 integral with vertical axis of an electric motor 59 (cf. also FIGS. 1 and 2). Motor 59 is mounted above the horizontal pivoting axis 12 on a support integral with the side member 14b of the second frame (FIG. 2). Also integral with said side member 14b of the second frame is a bracket 60 (FIGS. 1 and 2) the end of which is connected to the end of a bracket 61 (which is shown only on FIG. 1 while it has been omitted from FIG. 2 with a view to simplifying the same) through two hingedly connected arms 62 and 63. The pivoting axis of the hinged connections of arms 62 and 63 extends beneath said arms and carries a multi-stage relay pulley 64. The entire assembly is arranged in such a manner that the hinged connection of arm 62 and the end of bracket 60 is located on the axis of pulley 58 of motor 59. Furthermore, a multi-stage pulley 65 is fixedly mounted on the top end of an axis 66 which is mounted, in turn, on the rear face of tool-carrying plate 34, on the left hand end thereof (as shown in FIG. 1), said axis being adapted to rotate freely and being located exactly below the hinged connection of arm 63 on the end of bracket 61. Pulley 58 is coupled by at least one belt 67 to a first stage of pulley 64, a second stage of which, having a diameter smaller than that of said first stage, is coupled to a first stage of pulley 65 by means of at least one belt 68. Preferably, belts 67 and 68 are each constituted by two belts of equal lengths. Said two belts have preferably a circular section and different elastic properties, and they engage, respectively, two grooves of equal diameter being located on an identical stage of pulleys 58, 64 and 65, respectively. This arrangement is far more advantageous than the utilization of single belts 67 and 68 having, for instance, a trapezoidal section, such belts being prone, at the high rotational speeds which must be transmitted in the instant machine, to produce considerable vibration; such vibration is entirely avoided when instead of a single belt two belts, preferably of different elastic properties, are used, as described hereinabove. It will be understood that when tool-carrying plate 34 is displaced in directions A and B for reproducing the displacements of follower 37 on the surface of the master pattern, hingedly connected arms 62 and 63 follows the displacements of said tool-carrying plate without impeding the continuity of the transmission of the rotational motion of pulley 58 integral with the axis of motor 59 to pulley 65 mounted on tool-carrying plate 34. This transmission of rotational motion is not hampered either if and when the second frame and the tool-carrying plate 34 effect pivotal displacements about horizontal axis 12, as motor 59 and bracket 60 are integral with side member 14b of the second frame which, in this case, also pivots about said axis 12, together with the first frame.

Belts 69a, 69b, 69c and 69d, respectively, couple pulley 65 to pulley 57a, pulley 57a to pulley 57b, pulley 57b to pulley 57c and pulley 57c to pulley 57d, as shown on FIG. 6. When motor 59 drives pulley 58, for instance, at a rotational speed of 2 800 rpm the whole transmission assembly described hereinbefore is so dimensioned that pulleys 64 and 65 have a speed, for example, of 3 000 rpm, while pulleys 57a to 57d have a speed of 9 000 rpm; the last transmission stage associated to each spindle, for instance the transmission stage constituted by elements 54d and 55d in the case of spindle 35d (FIG. 5) is then dimensioned in such a manner that head 50a of said spindle is driven at a speed of 20 000 rpm.

In the embodiment of the driving mechanism of the spindles which is shown in FIG. 6 the respective lengths of belts 69a to 69d must be adapted to the mutual distance between said spindles; consequently, these belts must be replaced when these distances between the spindles are modified. Thus, this embodiment is useful more specifically in applications where the distances between the spindles are not often modified, or in applications where these distances are never modified, in which case, the supports of the spindles, constituted by L-shaped sections 48 (FIG. 5) may be fixedly mounted, e.g., by means of screws or bolts, on the front face of tool-carrying plate 34, which then needs not be provided with T-shaped grooves such as the grooves shown at 49a and 49b. The modified form of the driving mechanism for the spindles which is diagrammatically shown in plane view in FIG. 7 is more advantageous for applications wherein the distance between said spindles have to be frequently modified; indeed, in this embodiment, no belts need be changed when such modifications of the distances between the spindles is effected. In FIG. 7 the same reference numerals are used as those of FIG. 6 to design identical or similar elements. The rotational motion of pulley 65 is transmitted simultaneously to all pulleys 57a to 57d by means of a single belt 70 which is guided in such a manner that it is applied against more than half of the periphery of each one of said pulleys 57a to 57d. FIGS. 8 and 9 show, respectively, in plane view and in section taken along the line IX—IX of FIG. 8, the manner of guiding said single belt 70, for example in the zone of spindle 35d. The horizontal flange of section piece 48, which constitutes the support of spindle 35d, carries an idling roller 71d mounted at a small distance from the corresponding pulley 57d, said idling roller being slightly displaced rearwardly and toward the left side (as shown in FIG. 7) with respect to pulley 57 d, whereby single belt 70, after passing about said pulley 57d forms a loop around said idling roller 71d as shown in FIGS. 7 and 8. Due to this arrangement, the distances between spindles 35a to 35d may be modified at will, while it is not necessary to replace single belt 70 by a belt having a different length.

Numerous accessories may be mounted on the engraving machine according to the present invention, which allow said machine to be transformed to constitute a universal machine which may be used for various operations occuring in the engraving field. Some of these accessories have already been mentioned and other accessories will be indicated hereinbelow by way of example, but not by way of limitation.

It has already been mentioned hereinabove that lever 28 (FIGS. 3 and 5) allows tool-carrying plate 34 to be lowered until the points of the thin cutting millers mounted on spindles 35a to 35d are located in the vicinity of work table 3, while springs 26a cause said tool-carrying plate to be raised automatically as lever 28 is released. If the first sliding members 13a, 13b have previously been locked on axis 12 and if, furthermore, the second frame 14a, 14b and the third slide members 23, 32 have been locked so as to prevent their translational motions, the above-mentioned utilization of lever 28 allows the four spindles 35a to 35d to be used as drilling tools, with a view to carrying out auxiliary drilling operations which are required in connection with numerous engraving and similar operations. Furthermore, a milling cutter spindle 72 (FIGS. 1, 2 and 3) provided with a medium or great diameter milling cutter 73 may be removably mounted, for instance by means of bolts, on tool-carrying plate 34, this spindle 72 being mounted e.g., between the two inner engraving spindles 35b and 35c. In the embodiment shown in FIGS. 1 to 3, spindle 72 is driven by an auxiliary motor 74 so as to rotate about a vertical axis; motor 74 is supported by a cradle 75 mounted on the top portion of machine frame 2, so as to be able to effect pivotal motions about a horizontal axis 76, above tool-carrying plate 34. The shaft of auxiliary motor 74 carries a pulley 77 which, when cradle 75 is downwardly pivoted so as to effect an angular displacement of 90° about axis 76, is located substantially in the same plane as a pulley 78 provided on the outer portion of the driving shaft of spindle 72, whereby said pulleys 77 and 78 may be coupled by means of a belt with a view to driving milling cutter 73. In this position, cradle 75 rests on the top edge of tool-carrying plate 34 and can be positively held in this position, by means of bolts, so as to relieve the vertical slide members 21a, 21b which are preferably locked in this case. Milling cutter 73 allows various auxiliary operations to be carried out, such as surfacing operations which are required for certain types of engraving operations.

FIG. 1 further shows a support 79 mounted above tool-carrying plate 34 and horizontally slideable, e.g., in a dove-tailed groove provided in the top face of frame 2 of the machine below cradle 75 in its raised position. When support 79 extends from frame 2 so that its front end is located above tool-carrying plate 34 and protrudes over spindles 35a to 35d, a convenient master pattern may be fixed on the lower face of said end of siad support, by convenient means, such as screws screwed into tapped holes provided in such support, while an auxiliary follower (not shown) is mounted on said tool-carrying plate 34 at the level of said auxiliary master pattern, whereby said follower is enabled to explore the lower surface of said pattern. The said master pattern mounted on the retractable support 79 may be a pattern of one of the following two types:

a. an engraved model which may then be reproduced simultaneously by spindles 35a to 35d with a reduction ratio of 1:1, the engravings thus obtained represent images of the master pattern as viewed in a planar mirror, which is desirable in certain specific applications;

b. a non engraved impression of the concave or convex surface to be engraved on a work piece fixed on work table 3. While the main follower 37 (FIG. 1) explores the surface of an engraved planar master pattern, fixed for instance on auxiliary table 10, this engraving may be reproduced with a chosen reduction ratio, by one of spindles 35a to 35d on the non planar surface of said work piece, due to the vertical guiding of tool-carrying plate 34 by the auxiliary follower, the latter being held in contact with said impression by the action of springs 26a (FIG. 5). In this application, said vertical slide member 39a (FIG. 2) must be released so as to render the vertical displacements of main follower 37 and pantograph 38 independent of the displacements of tool-carrying plate 34.

The above-described engraving machine may also be used in the following manner: A follower such as follower 37 is mounted directly on tool-carrying plate 34, for instance instead of one of the engraving spindles which are removably mounted; this follower is then used to explore the surface of a master pattern directly fixed on work table 3 in a convenient location. Due to this arrangement, it is possible to reproduce with a reduction ratio of 1:1 three engravings from said master pattern.

It will be understood that the thin milling cutters mounted on the four spindles 35a to 35d may be utilized for precision milling operations, the working conditions being in this case the same as those described hereinabove with reference to the utilization of the milling spindle 73 equipped with a milling cutter having a comparatively large diameter.

Figure 10:
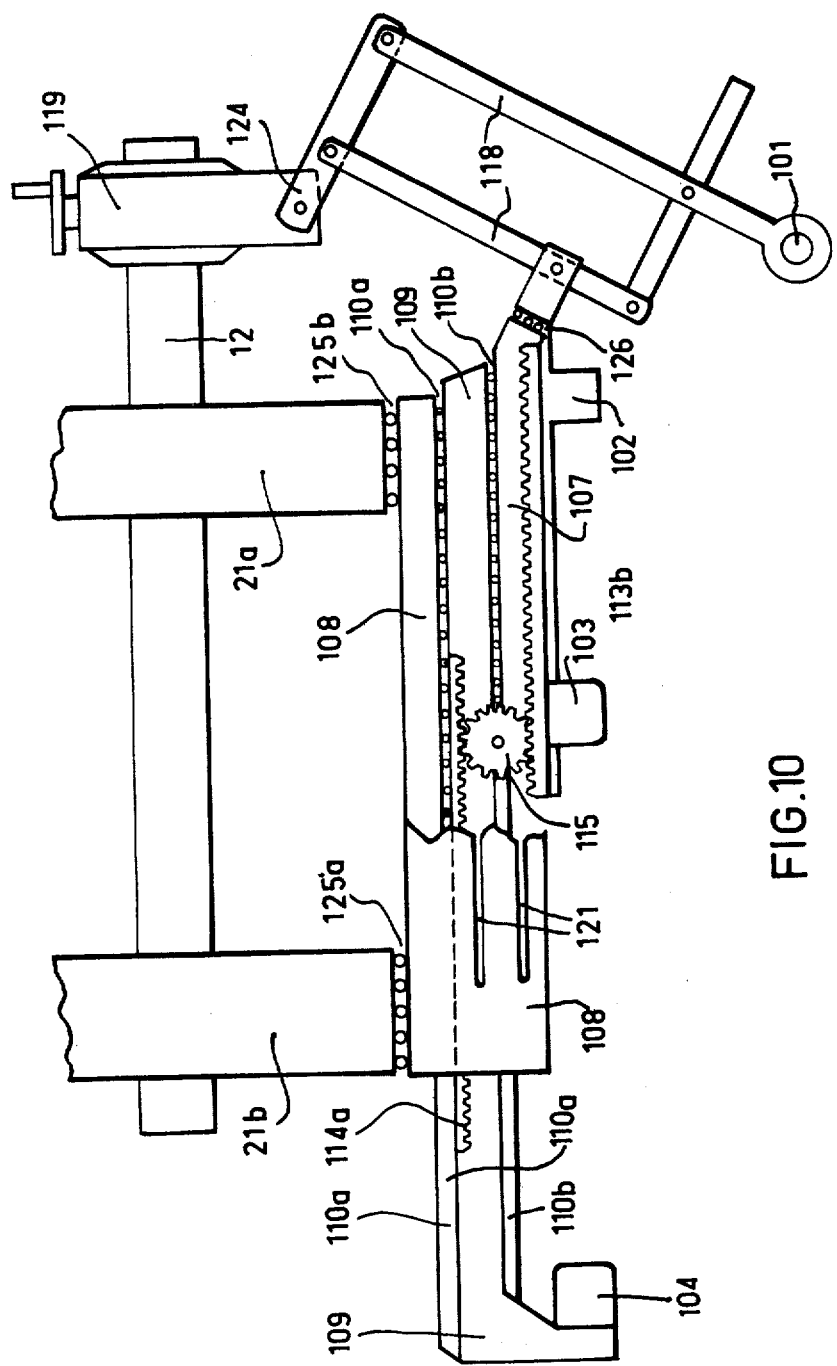
FIG. 10 shows the tool carrying means and the pantograph of another embodiment of the machine according to the invention.

FIG. 10 shows, in plane view, the tool-carrying means and the pantograph of another advantageous embodiment of the engraving machine according to the instant invention.

In this embodiment, the tool-carrying means comprise two tool-carrying plates 107, 109 carrying each an engraving tool 103, 104, respectively. Tool-carrying plates 107 and 109 are horizontally and symmetrically displaceable in opposite directions due to two racks 113b and 114a integral with plates 107 and 109, respectively, and a rotatively mounted toothed wheel 115 turning about a stationary axis and meshing simultaneously with said racks 113b and 114a. Tool-carrying plate 102 is connected at a chosen location to pantograph 108 in a manner simular to that described in the preceding embodiments. Pantograph 118 is connected to tool-carrying plate 107 by vertical slide means 126 which render said pantograph independant of said tool-carrying plate in the vertical direction, and which allow the pantograph to be locked by convenient locking means.

Furthermore, tool-carrying plate 107 is movably mounted on tool-carrying plate 109 by horizontal slide means 110b, while tool-carrying plate 109 is movably mounted, in turn, on a horizontally fixed plate 108 by horizontal slide means 110a, said plate 108 being mounted by vertical slide means 125b on the associated frame 21a, 21b which is pivotally mounted on horizontal axis 12, as explained hereinabove with reference to the preceding embodiments.

It will be understood that due to this arrangement the motion imparted to follower 101 provided on the adjustable pantograph 118 will be transmitted to tool-carrying plate 102, which motion will then be transmitted to tool-carrying plate 109 in respective symmetrically opposed directions, due to racks 113b and 114a and toothed wheel 115 interposed therebetween. Consequently, this embodiment allows for producing simultaneously two engraved work pieces, the configuration of each one of said work pieces being symmetrical with respect to that of the other work piece, which is highly desirable in many fields, e.g., in the field of manufacturing moulds for shoes or for automobile rear light fixtures, etc..

It should also be pointed out that pantograph 118 provides reduction ratios from about 1.5:1 to about 100:1. In order to permit the corresponding adjustments of the pantograph, the connection 119 between the latter and the horizontal axis 12 is adjustable so as to allow for displacement of hinged connection 124 with respect to axis 12.

Advantageously, tool-carrying plate 107 also carries a supplementary follower 102 which allows a master pattern fixed on the work table of the machine to be reproduced in the form of two symmetrically shaped engraved work pieces, with a reduction ratio of 1:1.

It is thought that the invention and many of its attendant advantages will be understood from the foregoing description and it will be apparent that various changes may be made in the form, construction, and arrangement of the parts without departing from the spirit and scope of the invention, or sacrificing all of its material advantages, the embodiments hereinbefore described being merely given by way of example.

What is claimed is:

1. A universal engraving machine comprising, in combination:

a horizontal work table for supporting work pieces to be engraved;

tool-carrying means;

means for displacing said tool carrying means in a longitudinal horizontal direction, a transverse horizontal direction, a vertical direction and an angular direction about a longitudinal horizontal axis;

a plurality of mandrels slideably arranged in a tubular body mounted on said tool-carrying means, a plurality of engraving tools, each mounted in one of said mandrels, each mandrel being provided at a location at close proximity to the associated tool, an endless driving belt, belt-engaging means adapted to engage said endless driving belt means for rotating said mandrel and the tool mounted therein;

driving means acting on said belt for rotatively driving said mandrels and tools through said endless driving belt means at a comparatively high rotational speed;

at least one follower adapted to translationally and angularly explore a master pattern, and adjustable pantograph means connecting said follower to said tool-carrying means for transmitting to the latter the exploring translational and angular motions of said follower with a preselected reduction ratio.

2. A universal engraving machine comprising, in combination:

a horizontal work table displaceable in a longitudinal and a transverse horizontal direction;

tool-carrying means comprising frame members transversely extending and pivotally mounted on a longitudinally extending horizontal axis, first slide members slideably mounted on said frame members and displaceable in said transverse direction with respect to said frame members, longitudinally extending vertical plate members provided on said first slide members, second slide members on said plate member and vertically displaceable therewith, a third slide member mounted on said second slide members and longitudinally displaceable therewith;

a plurality of mandrels slideably arranged in a tubular body mounted on said third slide member, a plurality of engraving tools, each mounted in one of said mandrels, and each mandrel being provided at a location at close proximity to the associated tool, an endless driving belt means, belt-engaging means adapted to engage said endless driving belt means for rotating said mandrel and the tool associated therewith;

driving means acting on said belt means for rotatively driving said mandrels and tools through said endless belt means at a comparatively high rotational speed;

at least one follower adapted to translationally and angularly explore a master pattern, and adjustable pantograph means connecting said follower to said tool-carrying means for transmitting to the latter the exploring translational and angular motions of said follower with a preselected reduction ratio.

3. The engraving machine of claim 2, further comprising elastic biasing means, and manually operable means for lowering said second slide members with respect to said first slide members against the bias of said elastic biasing means.

4. The engraving machine of claim 2, wherein said driving means comprises a single motor, and wherein said endless belt means comprises a plurality of transmission belts associated with a plurality of pulleys mounted on hingedly interconnected arms.

5. The engraving machine of claim 2, further comprising a plurality of tool driving pulleys, each mandrel being associated with a corresponding tool-driving pulley, said tool-driving pulleys being driven by a common pulley-driving belt, and each tool-driving pulley being drivingly connected to the respective belt-engaging means of each mandrel by a respective individual tool-driving belt.

6. The engraving machine of claim 2, wherein counter-weight means are displaceably mounted on said first slide members for maintaining the center of gravity of the assembly constituted essentially of said first, second and third slide members and said tools mounted thereon in a location substantially vertically above said horizontal axis.

7. The engraving machine of claim 2, further comprising a retractable support, a supplementary follower mounted on said tool-carrying means and adapted to explore an auxiliary master pattern fixed on said retractable support, and a vertical slide member connecting said pantograph means to said tool-carrying means in such a way that the latter are vertically displaceable with resect to said pantograph means, said vertical slide member being adapted to be selectively released to permit vertical displacement of said tool-carrying means with respect to said pantograph means, and locked so as to prevent said vertical displacement.

8. The engraving machine of claim 2, wherein individual adjusting means for vertical adjustment of said tools relative to the respective tubular bodies are provided, said adjusting means comprising micrometric adjusting means.

* * * * *